(12) United States Patent
Ushikura et al.

(10) Patent No.: US 10,261,197 B2
(45) Date of Patent: Apr. 16, 2019

(54) RADIATION DETECTOR AND RADIOGRAPHIC IMAGING APPARATUS

(71) Applicant: FUJIFILM Corporation, Minato-ku, Tokyo (JP)

(72) Inventors: Shinichi Ushikura, Kanagawa (JP); Keiichi Akamatsu, Kanagawa (JP); Haruyasu Nakatsugawa, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/890,370

(22) Filed: Feb. 7, 2018

(65) Prior Publication Data

US 2018/0275290 A1 Sep. 27, 2018

(30) Foreign Application Priority Data

Mar. 22, 2017 (JP) .................................. 2017-056558

(51) Int. Cl.
*G01T 1/20* (2006.01)
*G01T 1/202* (2006.01)

(52) U.S. Cl.
CPC ............ *G01T 1/2018* (2013.01); *G01T 1/202* (2013.01); *G01T 1/2023* (2013.01)

(58) Field of Classification Search
CPC ...... G01T 1/2018; G01T 1/2023; G01T 1/202
See application file for complete search history.

(56) References Cited

U.S. PATENT DOCUMENTS

| 7,315,027 | B2* | 1/2008 | Okada | G01T 1/2018 250/370.11 |
|---|---|---|---|---|
| 2003/0001101 | A1* | 1/2003 | Homme | G01T 1/202 250/370.11 |
| 2011/0291018 | A1* | 12/2011 | Nagano | G01T 1/2018 250/369 |
| 2012/0153170 | A1* | 6/2012 | Nariyuki | G01T 1/2018 250/368 |
| 2013/0099344 | A1* | 4/2013 | Ishii | G01T 1/2018 257/432 |
| 2013/0112882 | A1* | 5/2013 | Osawa | G01T 1/202 250/361 R |
| 2013/0161522 | A1* | 6/2013 | Ishida | G01T 1/20 250/366 |
| 2016/0116606 | A1* | 4/2016 | Itaya | G01T 1/2023 250/366 |

FOREIGN PATENT DOCUMENTS

JP 2011-247822 A 12/2011

* cited by examiner

*Primary Examiner* — Yara B Green
(74) *Attorney, Agent, or Firm* — SOLARIS Intellectual Property Group, LLC

(57) ABSTRACT

A radiation detector includes a flexible substrate, and a sensor board including a layer which is provided on a first surface of the substrate and in which a plurality of pixels, which accumulate electrical charges generated in accordance with light converted from radiation, are formed, a conversion layer that is provided on the first surface side of the sensor board to convert radiation into light, a protective film that covers at least a region ranging from a region that covers the conversion layer to a region at an outer peripheral part of a second surface opposite to the first surface of the substrate, and a supporting member that supports the region of the substrate via the protective film from the second surface side of the substrate.

14 Claims, 9 Drawing Sheets

RADIATION DETECTOR 10

RADIATION DETECTOR 10

RADIOGRAPHIC IMAGING APPARATUS 1

RADIOGRAPHIC IMAGING APPARATUS 1

RADIATION DETECTOR 10

RADIATION DETECTOR AND RADIOGRAPHIC IMAGING APPARATUS

CROSS-REFERENCE TO RELATED APPLICATION

This application claims priority under 35 USC 119 from Japanese Patent Application No. 2017-056558 filed Mar. 22, 2017, the disclosure of which is incorporated by reference herein.

BACKGROUND

Technical Field

The present invention relates to a radiation detector and a radiographic imaging apparatus.

Related Art

In the related art, radiographic imaging apparatuses that perform radiographic imaging for medical diagnosis have been known. A radiation detector for detecting radiation transmitted through a subject and generating a radiographic image is used for such radiographic imaging apparatuses.

As the radiation detector, there is one including a conversion layer, such as a scintillator, which converts radiation into light, and a sensor board in which a plurality of pixels that accumulate electrical charges generated in accordance with light converted in the conversion layer are provided. As such a radiation detector, there is one in which the conversion layer is covered with a protective film for improving durability (refer to JP2011-247822A).

SUMMARY

In the technique described in the above JP2011-247822A, surfaces (an upper surface and a side surface of the conversion layer) other than a surface (a lower surface) that is in contact with the sensor board of the conversion layer are covered with a protective film. Since one end of this protective film is wrapped around a back surface (a surface that is not in contact with the conversion layer) of the sensor board, moisture resistance is improved by a hotpress part being provided in the wrapped-around protective film on the back surface.

Meanwhile, it is desired to use a flexible substrate for the sensor board. By using the flexible substrate, for example, a subject can be easily imaged by reducing the weight of a radiographic imaging apparatus (radiation detector).

In a case where the flexible substrate is used for the sensor board, deflection occurs in the substrate, that is, the sensor board. As the deflection occurs in the sensor board, for example, there is a case where the durability and the moisture resistance of the conversion layer degrades. In this case, even in a case where the protective film is provided as in the technique described in JP2011-247822A, the durability and the moisture resistance are not sufficient.

For that reason, in a case where the flexible substrate is used for the sensor board, there is a case where the deterioration of the image quality of a radiographic image is caused.

An object of the present disclosure is to provide a radiation detector and a radiographic imaging apparatus that can suppress deterioration of the image quality of a radiographic image in a case where a flexible substrate is used for a sensor board.

In order to achieve the above object, a radiation detector of the present disclosure comprises a sensor board including a flexible substrate and a layer which is provided on a first surface of the substrate and in which a plurality of pixels, which accumulate electrical charges generated in accordance with light converted from radiation, are formed; a conversion layer that is provided on the first surface side of the sensor board to convert radiation into light; a protective film that covers at least a region ranging from a region that covers the conversion layer to a predetermined region at an outer peripheral part of the second surface opposite to the first surface of the substrate; and a supporting member that supports the predetermined region of the substrate via the protective film from the second surface side of the substrate.

Additionally, in the radiation detector of the present disclosure, the predetermined region may be a region on the second surface of the substrate corresponding to the outside of a region on the first surface of the substrate corresponding to a pixel region that is a region where the plurality of pixels are provided.

Additionally, in the radiation detector of the present disclosure, the plurality of pixels may include a plurality of first pixels, and a plurality of second pixels that are provided at an outer peripheral part of the plurality of first pixels and may have a different application from the plurality of first pixels in forming a radiographic image, and the predetermined region may be a region on the second surface of the substrate corresponding to the outside of a region where the plurality of first pixels are provided.

Additionally, in the radiation detector of the present disclosure, a plurality of the supporting members may be provided along a peripheral edge on the peripheral edge inward at a predetermined distance from an outer periphery of the second surface, and a total length of the plurality of supporting members along the peripheral edge may be equal to or more than half of a length of the peripheral edge and less than the length of the peripheral edge.

Additionally, in the radiation detector of the present disclosure, the sensor board may have a pair of facing sides, and the supporting member may be provided at least at each of the pair of sides.

Additionally, in the radiation detector of the present disclosure, the protective film may include at least a first protective film that covers a surface opposite to a surface of the conversion layer where the sensor board is provided and a side surface of the conversion layer, and a second protective film that covers a region including the predetermined region and the entire first protective film.

Additionally, in the radiation detector of the present disclosure, the protective film may include at least a first protective film that covers a surface opposite to a surface of the conversion layer where the sensor board is provided and a side surface of the conversion layer, and a second protective film that covers a region including the predetermined region and an end part of the first protective film.

Additionally, the radiation detector of the present disclosure may further comprise an antistatic film provided on the second surface of the substrate.

Additionally, in the radiation detector of the present disclosure, the protective film may cover the entire second surface.

Additionally, the radiation detector of the present disclosure may be used for imaging in which the second surface of the substrate is irradiated with radiation.

Additionally, in the radiation detector of the present disclosure, the conversion layer may include CsI.

Additionally, a radiographic imaging apparatus of the present disclosure comprises the radiation detector of the present disclosure; a control unit that outputs control signals for reading electrical charges accumulated in the plurality of pixels; a drive unit that reads the electrical charges from the plurality of pixels in accordance with the control signals; and a signal processing unit to which has electrical signals according to the electrical charges read from the plurality of pixels are input, and which generates image data according to the input electrical signals to output the image data to the control unit.

Additionally, in the radiographic imaging apparatus of the present disclosure, the control unit and the radiation detector may be provided side by side in a direction intersecting a lamination direction in which a substrate in the radiation detector, a layer in which the plurality of pixels are formed, and a conversion layer are arranged.

Additionally, the radiographic imaging apparatus of the present disclosure may further comprise a power source unit that supplies electrical power to at least one of the control unit, the drive unit, or the signal processing unit, and the power source unit, the control unit, and the radiation detector may be provided side by side in a direction intersecting a lamination direction in which a substrate in the radiation detector, a layer in which the plurality of pixels are formed, and a conversion layer are arranged.

According to the present disclosure, the deterioration of the image quality of a radiographic image can be suppressed in a case where the flexible substrate is used for the sensor board.

BRIEF DESCRIPTION OF THE DRAWINGS

Exemplary Embodiments of the present invention will be described in detail with reference to the following figures, wherein.

DETAILED DESCRIPTION

Hereinafter, embodiments of the invention will be described in detail with reference to the drawings. In addition, the present embodiments do not limit the invention.

First Embodiment

A radiographic imaging apparatus of the present embodiment has a function of capturing a radiographic image of an object to be imaged, by detecting radiation transmitted through a subject, which is an object to be imaged, and outputting image information representing a radiographic image of the subject.

Figure 1:
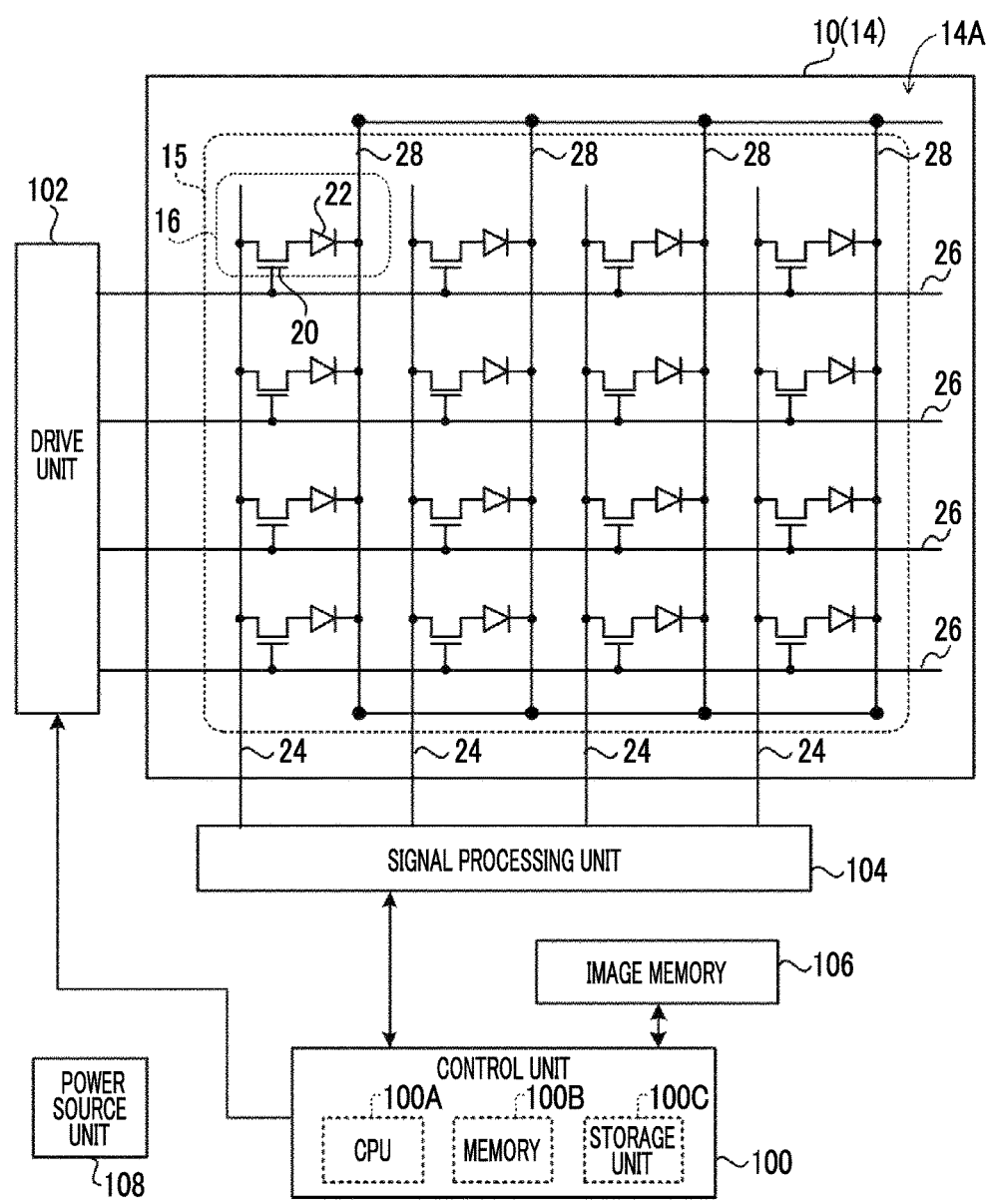
FIG. 1 is a block diagram illustrating an example of the configuration of main parts of an electrical system in a radiographic imaging apparatus of a first embodiment, and is also a configuration view illustrating an example of the configuration of a sensor board in a radiation detector.

First, the outline of an example of the configuration of an electrical system in the radiographic imaging apparatus of the present embodiment will be described with reference to FIG. 1. FIG. 1 is a block diagram illustrating an example of the configuration of main parts of the electrical system in the radiographic imaging apparatus of the present embodiment.

As illustrated in FIG. 1, the radiographic imaging apparatus 1 of the present embodiment includes a radiation detector 10, a control unit 100, a drive unit 102, a signal processing unit 104, an image memory 106, and a power source unit 108.

The radiation detector 10 includes a sensor board 12 (refer to FIG. 3) and a conversion layer (refer to FIG. 3) that converts radiation into light. The sensor board 12 includes a flexible substrate 14 and a plurality of pixels 16 provided on a first surface 14A of the substrate 14. In addition, in the following, the plurality of pixels 16 are simply referred to as "pixels 16".

As illustrated in FIG. 1, each pixel 16 of the present embodiment includes a sensor part 22 that generates and accumulates an electrical charge in accordance with the light converted by the conversion layer, and a switching element 20 that reads the electrical charge accumulated in the sensor part 22. In the present embodiment, as an example, a thin film transistor (TFT) is used as the switching element 20. For that reason, in the following, the switching element 20 is referred to as a "TFT 20". In the present embodiment, a layer in which the pixels 16 are formed on the first surface 14A of the substrate 14 is provided as a flattened layer in which the sensor parts 22 and the TFTs 20 are formed. In the following, there is a case where the layer in which the pixels 16 are formed is also referred to as the "pixels 16" for convenience of description.

The pixels 16 are two-dimensionally disposed in one direction (a scanning wiring direction corresponding to a transverse direction of FIG. 1, hereinafter referred to as a "row direction"), and a direction intersecting the row direction (a signal wiring direction corresponding to the longitudinal direction of FIG. 1, hereinafter referred as a "column direction") in an active area 15 of the sensor board 12. Although an array of the pixels 16 are illustrated in a simplified manner in FIG. 1, for example, 1024×1024 pixels 16 are disposed in the row direction and the column direction.

Additionally, a plurality of scanning wiring lines 26, which are provided for respective rows of the pixels 16 to control switching states (ON and OFF) of the TFTs 20, and a plurality of signal wiring lines 24, which are provided for respective columns of the pixels 16 and from which electrical charges accumulated in the sensor parts 22 are read, are provided in a mutually intersecting manner in the radiation detector 10. The plurality of scanning wiring lines 26 are respectively connected to the drive unit 102 via pads (not illustrated), respectively, and thereby, driving signals, which are output from the drive unit 102 to drive the TFTs 20 to control the switching states thereof, flow to the plurality of scanning wiring lines 26, respectively. Additionally, the plurality of signal wiring lines 24 are respectively connected to the signal processing unit 104 via pads (not illustrated), respectively, and thereby, electrical charges read from the respective pixels 16 are output to the signal processing unit 104 as electrical signals. The signal processing unit 104 generates and outputs image data according to the input electrical signals.

The control unit 100 to be described below is connected to the signal processing unit 104, and the image data output from the signal processing unit 104 is sequentially output to the control unit 100. The image memory 106 is connected to the control unit 100, and the image data sequentially output from the signal processing unit 104 is sequentially stored in the image memory 106 under the control of the control unit 100. The image memory 106 has a storage capacity capable of storing image data equivalent to a predetermined number of sheets, and whenever radiographic images are captured, image data obtained by the capturing is sequentially stored in the image memory 106.

The control unit 100 includes a central processing unit (CPU) 100A, a memory 100B including a read only memory (ROM), a random access memory (RAM), and the like, and a nonvolatile storage unit 100C, such as a flash memory. An example of the control unit 100 is a microcomputer or the like. The control unit 100 controls the overall operation of the radiographic imaging apparatus 1.

Additionally, common wiring lines 28 are provided in a wiring direction of the signal wiring lines 24 at the sensor parts 22 of the respective pixels 16 in order to apply bias voltages to the respective pixels 16. Bias voltages are applied to the respective pixels 16 from a bias power source by connecting the common wiring lines 28 to the bias power source (not illustrated) outside the sensor board 12 via a pad (not illustrated).

The power source unit 108 supplies electrical power to various elements or various circuits, such as the control unit 100, the drive unit 102, the signal processing unit 104, the image memory 106, and power source unit 108. In addition, in FIG. 3, illustration of wiring lines, which connect the power source unit 108 and various elements or various circuits together, is omitted in order to avoid complication.

Figure 2:
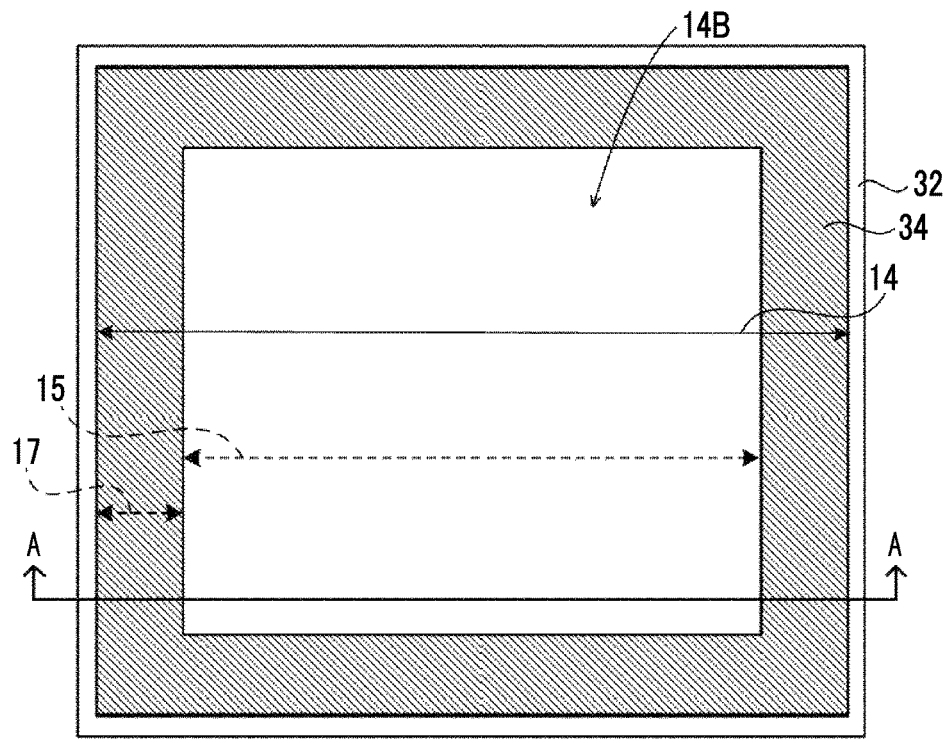
FIG. 2 is a plan view of the example of the radiation detector of the first embodiment as seen from a side opposite to a side where a conversion layer is provided.

Moreover, the radiation detector 10 of the present embodiment will be described in detail. FIG. 2 is a plan view of the radiation detector 10 of the present embodiment as seen from a second surface 14B opposite to the first surface 14A. Additionally, FIG. 3 is a cross-sectional view taken along line A-A of the radiation detector 10 in FIG. 2.

Figure 3:
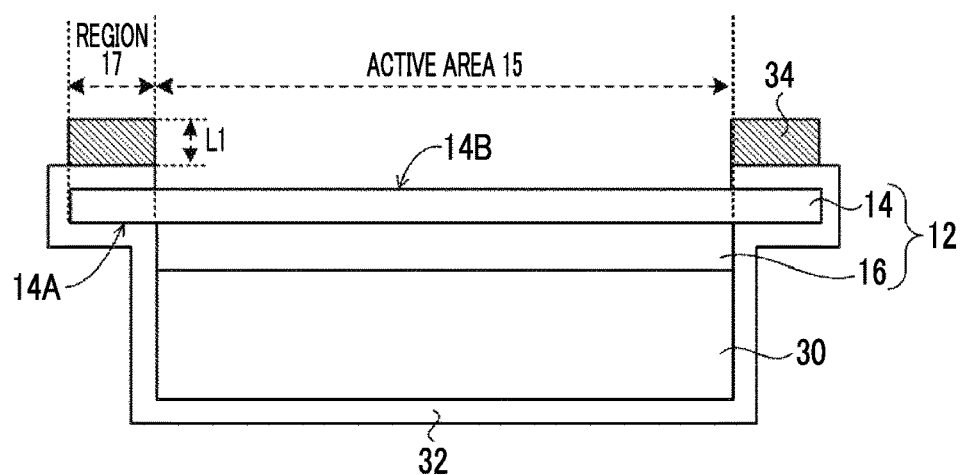
FIG. 3 is a cross-sectional view taken along line A-A of the radiation detector illustrated in FIG. 2.

As illustrated in FIGS. 2 and 3, the radiation detector 10 of the present embodiment includes the sensor board 12 including the substrate 14 and the pixels 16, a conversion layer 30, a protective film 32, and a supporting member 34, and the substrate 14, the pixels 16, and the conversion layer 30 are provided in this order. In addition, in the following, a direction (upward-downward direction in FIG. 3) in which the substrate 14, the pixels 16, and the conversion layer 30 are arranged is referred to as a lamination direction.

The substrate 14 is a resin sheet having flexibility and including, for example, plastics, such as polyimide. A specific example of the substrate 14 is XENOMAX (registered trademark). In addition, the substrate 14 may have any desired flexibility and is not limited to the resin sheet. For example, the substrate 14 may be a relatively thin glass substrate. The thickness of the substrate 14 may be a thickness such that desired flexibility is obtained in accordance with the hardness of a material, the size of the sensor board 12 (the area of the first surface 14A or the second surface 14B), or the like. For example, in a case where the substrate 14 is the resin sheet, the thickness thereof may be 5 μm to 125 μm. Additionally, in a case where the substrate 14 is the glass substrate, the substrate 14 has flexibility in a case where the thickness thereof becomes 0.3 mm or less in a size in which one side is 43 cm or less. Therefore, the thickness may be 0.3 mm or less.

Additionally, the substrate 14 has flexibility in a case where the thickness thereof becomes 0.3 mm or less in a large size in which one side is 43 cm or more. Therefore, the thickness may be 0.3 mm or less.

As illustrated in FIGS. 2 and 3, the plurality of pixels 16 are provided in an inner partial region on the first surface 14A of the substrate 14. That is, in the sensor board 12 of the present embodiment, no pixel 16 is provided at an outer peripheral part of the first surface 14A of the substrate 14. In the present embodiment, the region on the first surface 14A of the substrate 14 where the pixels 16 are provided is used as the active area 15. Additionally, the region of the second surface 14B opposite to the active area 15 of the substrate 14 is referred to as "a region of the second surface 14B corresponding to the active area 15". The active area 15 of the present embodiment is an example of the pixel region of the present disclosure. In addition, in the present embodiment, as an example, the pixels 16 are provided on the first surface 14A of the substrate 14 via an undercoat layer (not illustrated) using SiN or the like.

Additionally, as illustrated in FIG. 3, the conversion layer 30 covers the active area 15. In the present embodiment, a scintillator including CsI (cesium iodide) is used as an example of the conversion layer 30. It is preferable that such a scintillator includes, for example, CsI:Tl (cesium iodide to which thallium is added) or CsI:Na (cesium iodide to which sodium is added) having an emission spectrum of 400 nm to 700 nm at the time of X-ray irradiation. In addition, the emission peak wavelength in a visible light region of CsI:Tl is 565 nm.

In the present embodiment, the conversion layer 30 of CsI is directly formed as a columnar crystal on the sensor board 12 by a vapor-phase deposition method, such as a vacuum vapor deposition method, a sputtering method, and a chemical vapor deposition (CVD) method. In this case, the side of the conversion layer 30, which is in contact with the pixels 16, becomes a base point side in a growth direction of the columnar crystal.

In addition, in this way, in a case where the conversion layer of CsI is directly formed on the sensor board 12 by the vapor-phase deposition method, for example, a reflective layer (not illustrated) having a function of reflecting the light converted in the conversion layer 30 may be provided on the surface of the conversion layer opposite to the side in contact with the sensor board 12. The reflective layer may be directly provided in the conversion layer 30, and or may be provided via an adhesion layer or the like. As a material of the reflective layer in this case, it is preferable to use an organic material, and it is preferable to use, for example, at least one of white polyethylene terephthalate (PET), $TiO_2$, $Al_2O_3$, foamed white PET, a polyester-based high-reflection sheet, specular reflection aluminum, or the like. Particularly, it is preferable to use the white PET as the material from a viewpoint of reflectivity.

In addition, the white PET is obtained by adding a white pigment, such as $TiO_2$ or barium sulfate, to PET. Additionally, the polyester-based high-reflection sheet is a sheet (film) having a multilayer structure in which a plurality of thin polyester sheets are laminated. Additionally, the foamed white PET is white PET of which the front surface is porous.

Additionally, in a case where the scintillator of CsI is used as the conversion layer 30, the conversion layer 30 can also be formed in the sensor board 12 by a method different from that of the present embodiment. For example, the conversion layer 30 may be formed in the sensor board 12 by preparing a CsI vapor-deposited on an aluminum sheet or the like by the vapor-phase deposition method, and gluing the side of CsI, which is not in contact with the aluminum sheet, and the pixels 16 of the sensor board 12 together with an adhesive sheet or the like.

Moreover, unlike the radiation detector 10 of the present embodiment, GOS ($Gd_2O_2S$:Tb) or the like may be used as the conversion layer 30 instead of CsI. In this case, for example, the conversion layer 30 can be formed in the sensor board 12 by preparing a sheet glued on a support formed of the white PET or the like with an adhesion layer or the like, the sheet being obtained by dispersing GOS in a binder, such as resin, and by gluing the side of GOS on which the support is not glued, and the pixels 16 of the sensor board 12 together with an adhesive sheet or the like.

Additionally, in the radiation detector 10 of the present embodiment, as illustrated in FIGS. 2 and 3, the protective film 32 covers at least a region ranging from a region covering the conversion layer 30 to the region 17. Specifically, the protective film 32 covers the front surface (the surface that is not in contact with the pixels 16) of the conversion layer 30, a side surface of the conversion layer 30, and a side surface of the pixels 16, and further an entire region extending from the outer peripheral part of the first surface 14A to the region 17 of the second surface 14B wrapped around a side surface of the substrate 14. In addition, the region 17 is a region of an outer peripheral part excluding a region corresponding to the active area 15 of the second surface 14B of the substrate 14, and the region 17 of the present embodiment corresponds to an example of a predetermined region of the present disclosure.

As the protective film 32, for example, a moisture-proof film, such as a PARYLENE (registered trademark) film, or an insulating sheet, such as polyethylene terephthalate, is used.

Additionally, in the radiation detector 10 of the present embodiment, as illustrated in FIGS. 2 and 3, the supporting member 34 supports the region 17 of the substrate 14 via the protective film 32 from the second surface 14B side of the substrate 14. That is, the supporting member 34 backs up the substrate 14 via the protective film 32 in the region 17. The supporting member 34 is fixed to the protective film 32, for example, with an adhesive, such as double-stick tape or glue.

The supporting member 34 of the present embodiment has stiffness, and its stiffness at least in an in-plane direction of the second surface 14B is higher than that of the substrate 14. The supporting member 34, is plastics, such as polyethylene terephthalate (PET), an aluminum sheet, or the like, which has a size with which desired stiffness is obtained. In addition, since the supporting member 34 of the present embodiment is provided outside the region corresponding to the active area 15 of the second surface 14B, the transmittance and absorbance of radiation in the supporting member 34 do not have a large influence on capturing of a radiographic image. In addition, as a thickness L1 of the supporting member 34 is thicker, a distance (FIG. 4, a distance L2 reference) from a subject to the pixels 16 becomes longer. Therefore, defocusing occurs in a captured radiographic image. For that reason, it is preferable to set the thickness L1 of the supporting member 34 in accordance with desired stiffness and desired image quality.

The radiographic imaging apparatus 1 of the present embodiment is provided within a housing through which radiation is transmitted and which has waterproofness, antibacterial properties, and sealability.

Figure 4:
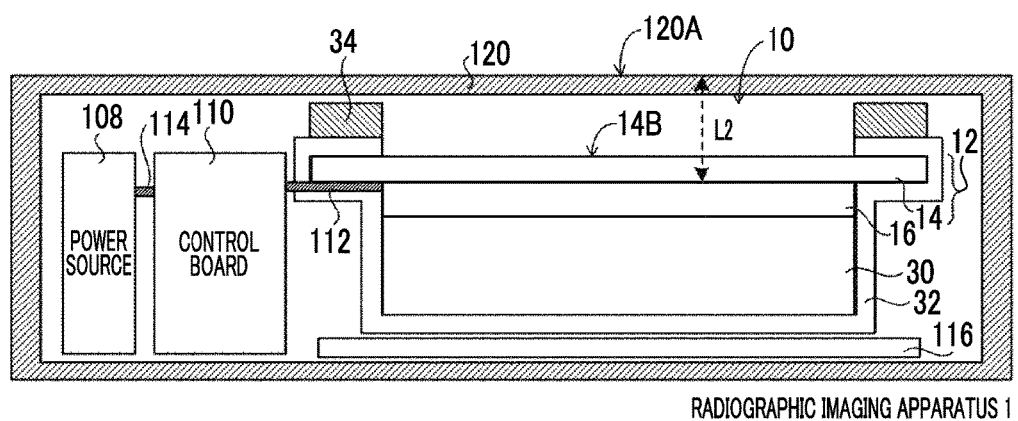
FIG. 4 is a cross-sectional view illustrating an example of a state where the radiation detector is provided within a housing in a case where the radiographic imaging apparatus of the present embodiment is applied to an irradiation side sampling type.

FIG. 4 is a cross-sectional view illustrating an example of a state where the radiation detector 10 is provided within a housing 120 in a case where the radiographic imaging apparatus 1 of the present embodiment is applied to an irradiation side sampling (ISS) type.

As illustrated in FIG. 4, the radiation detector 10, the power source unit 108, and a control board 110 are provided side by side in a direction intersecting the lamination direction within the housing 120. The radiation detector 10 is provided such that the second surface 14B of the substrate 14 faces an imaging surface 120A side of the housing 120 that is irradiated with radiation transmitted through a subject.

The control board 110 is a board in which the image memory 106, the control unit 100, and the like are formed, and is electrically connected to the pixels 16 of the sensor board 12 by a flexible cable 112 including a plurality of signal wiring lines. In addition, in the present embodiment, the control board 110 is a so-called chip on film (COF) in which the drive unit 102 and the signal processing unit 104 are provided on the flexible cable 112. However, at least one of the drive unit 102 or the signal processing unit 104 may be formed in the control board 110.

Additionally, the control board 110 and the power source unit 108 are connected together via a power source line 114.

A sheet 116 is further provided on a side to which the radiation transmitted through the radiation detector 10 is emitted, within the housing 120 of the radiographic imaging apparatus 1 of the present embodiment. The sheet 116 is, for example, a copper sheet. The copper sheet does not easily generate secondary radiation due to incident radiation, and therefore, has a function of preventing scattering to the rear side, that is, the conversion layer 30. In addition, it is preferable that the sheet 116 covers at least an entire surface of the conversion layer 30 from which radiation is emitted, and covers the entire conversion layer 30, and it is more preferable that the sheet 116 covers the entire protective film 32. In addition, the thickness of the sheet 116 may be selected in accordance with the flexibility, weight, and the like of the entire radiographic imaging apparatus 1. For example, in a case where the sheet 116 is the copper sheet and in a case where the thickness of the sheet is about 0.1 mm or more, the sheet 116 also has a function of having flexibility and shielding secondary radiation that has entered the inside of the radiographic imaging apparatus 1 from the outside. Additionally, for example, in a case where the sheet 116 is the copper sheet, it is preferable that the thickness is 0.3 mm or less from a viewpoint of flexibility and weight.

The radiographic imaging apparatus 1 illustrated in FIG. 4 is able to capture a radiographic image in a state where the radiation detector 10 is deflected in an out-plane direction of the second surface 14B of the substrate 14. For example, it is possible to maintain the radiation detector 10 in a deflected state in accordance with a capturing site or the like of a subject, and capture a radiographic image.

In the radiographic imaging apparatus 1 illustrated in FIG. 4, since the power source unit 108 and the control board 110 are provided at a peripheral part of the housing 120 having a relatively high stiffness, the influence of external forces to be given to the power source unit 108 and the control board 110 can be suppressed.

In addition, although FIG. 4 illustrates a form in which both the power source unit 108 and the control board 110 are provided on one side of the radiation detector 10, specifically, on one side of a rectangular radiation detector 10, a position where the power source unit 108 and the control board 110 are provided is not limited to the form illustrated in FIG. 4. For example, the power source unit 108 and the control board 110 may be provided so as to be respectively decentralized onto two facing sides of the radiation detector 10, or may be provided so as to be respectively decentralized onto two adjacent sides. Additionally, in the present embodiment, FIG. 4 illustrates a form in which the power source unit 108 and the control board 110 are one component part (board). However, the invention is not limited to the form illustrated in FIG. 4. A form in which at least one of the power source unit 108 or the control board 110 is a plurality of component parts (boards) may be adopted. For example, a form in which the power source unit 108 includes a first power source unit and a second power source unit (all are not illustrated) may be adopted, or the first power source unit and the second power source unit may be provided so as to be decentralized onto two facing sides of the radiation detector 10.

In addition, in a case where the entire radiographic imaging apparatus 1 (radiation detector 10) is deflected and a radiographic image is captured, the influence on the image resulting from the deflection may be suppressed by performing image correction.

Figure 5:
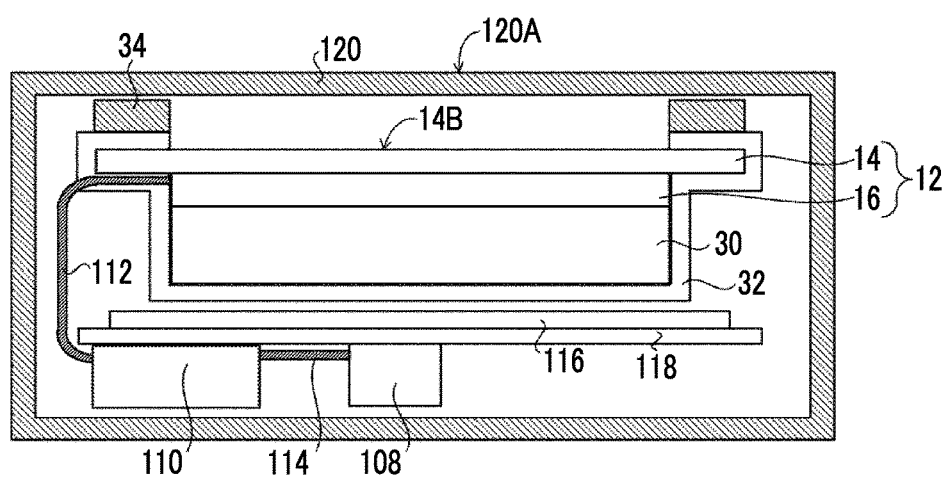
FIG. 5 is a cross-sectional view illustrating another example of the state where the radiation detector is provided within the housing in the case where the radiographic imaging apparatus of the present embodiment is applied to the irradiation side sampling type.

FIG. 5 is a cross-sectional view illustrating another example of a state where the radiation detector 10 is provided within the housing 120 in a case where the radiographic imaging apparatus 1 of the present embodiment is applied to the ISS type.

As illustrated in FIG. 5, the power source unit 108 and the control board 110 are provided side by side in the direction intersecting the lamination direction within the housing 120, the radiation detector 10, the power source unit 108, and the control board 110 are provided side by side in the lamination direction.

Additionally, in the radiographic imaging apparatus 1 illustrated in FIG. 5, a base 118 that supports the radiation detector 10 and the control board 110 is provided between the control board 110 and the power source unit 108, and the sheet 116. For example, carbon or the like is used for the base 118.

In the radiographic imaging apparatus 1 illustrated in FIG. 5, it is possible to capture a radiographic image in a state where the radiation detector 10 is slightly deflected in the out-plane direction of the second surface 14B of the substrate 14, for example, in a state where a central part thereof is deflected by about 1 mm to 5 mm. However, since the control board 110 and the power source unit 108, and the radiation detector 10 are provided in the lamination direction and the base 118 is provided, the central part is not deflected unlike the case of the radiographic imaging apparatus 1 illustrated in FIG. 4.

Generally, in a case where the substrate 14 is deflected, the conversion layer 30 is easily peeled from the sensor board 12. As described above, in the case of the ISS type, the conversion layer 30 is easily peeled due to its own weight. In a case where particularly an end part of the conversion layer 30 is peeled, moisture resistance degrades.

However, in the radiation detector 10 of the present embodiment, the protective film 32 covers at least the region ranging from the region covering the conversion layer 30 to the region 17 in the outer peripheral part of the second surface 14B of the substrate 14. Therefore, even in a case where the substrate 14 is deflected, the conversion layer 30 is not easily peeled. Additionally, in the radiation detector 10 of the present embodiment, the supporting member 34 supports the region 17, which is an outer peripheral region of the substrate 14, from the second surface 14B. Therefore, even in a case where the flexible substrate 14 in the sensor board 12 is deflected, the deflection in the region 17 is suppressed by the supporting member 34. Therefore, since the protective film 32 is not peeled from the sensor board 12 and the conversion layer 30, the effect of suppressing the peeling of the conversion layer 30 can be further enhanced.

Generally, in a case where the conversion layer 30 is peeled or deteriorates due to humidity or the like, deterioration of the quality of a generated radiographic image is caused. In contrast, in the radiation detector 10 of the present embodiment, the peeling of the conversion layer 30 is suppressed and the degradation of moisture resistance is suppressed. Therefore, the deterioration of the image quality of a generated radiographic image can be suppressed.

Second Embodiment

In a radiation detector 10 of the present embodiment, a configuration corresponding to the protective film 32 of the first embodiment is different. Therefore, this different configuration will be described.

Figure 6:
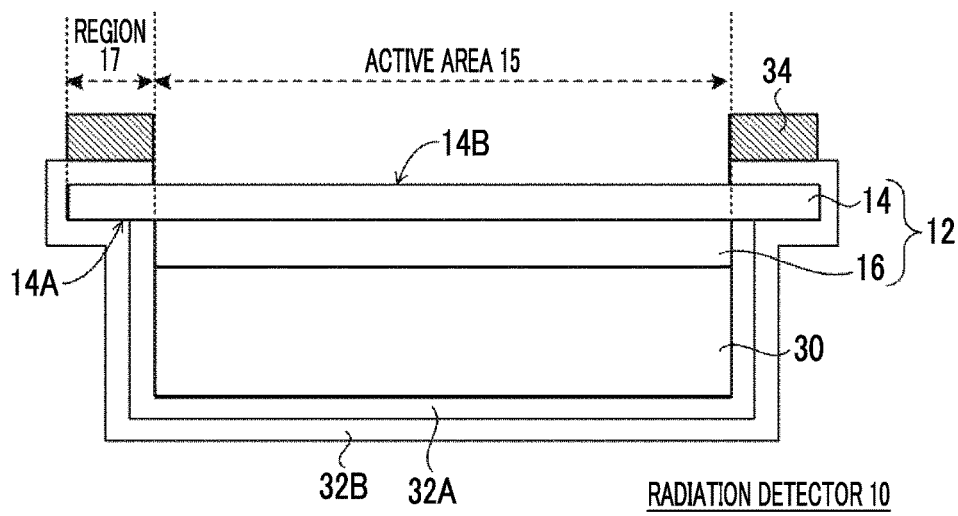
FIG. 6 is a cross-sectional view of an example of a radiation detector of a second embodiment.

A cross-sectional view of an example of the radiation detector 10 of the present embodiment is illustrated in FIG. 6. As illustrated in FIG. 6, the radiation detector 10 of the present embodiment includes two protective films of a first protective film 32A and a second protective film 32B, instead of the protective film 32 of the radiation detector 10 of the first embodiment.

Figure 7:
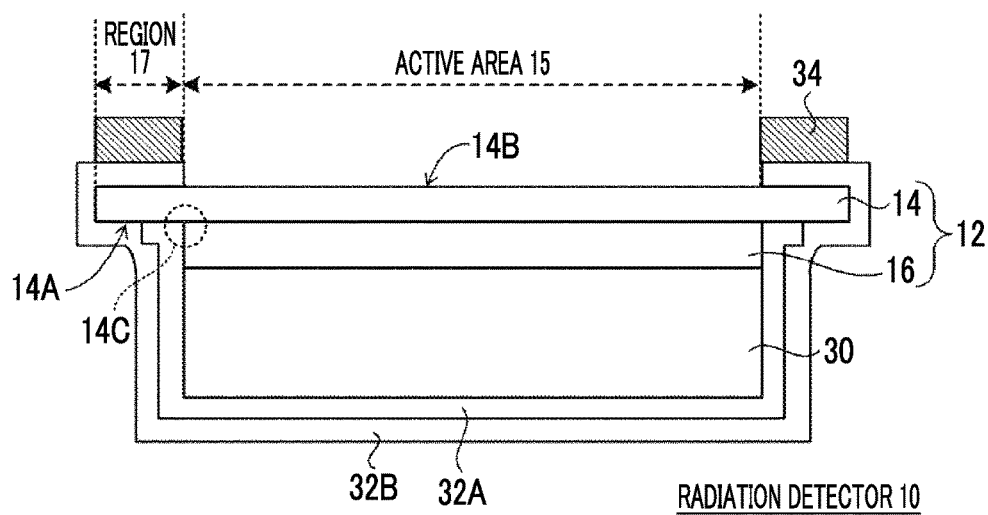
FIG. 7 is a cross-sectional view of another example of the radiation detector of the second embodiment.

As illustrated in FIG. 6, the first protective film 32A covers at least the surface of the conversion layer 30 opposite to the side where the sensor board 12 is provided, and the side surface of the conversion layer 30. Specifically, the first protective film 32A of the present embodiment covers the front surface (the surface that is not in contact with the pixels 16) of the conversion layer 30, the side surface of the conversion layer 30, and the side surface of the pixels 16. In addition, the first protective film 32A illustrated in FIG. 6 covers the side surface of the pixels 16. However, a form in which the first protective film 32A does not cover a part or the entirety of the side surface of the pixels 16 may be adopted. Additionally, although a form in which an end part (side surface) of the first protective film 32A is in contact with the first surface 14A of the substrate 14 is illustrated as the first protective film 32A illustrated in FIG. 6. However, the end part of the first protective film 32A and the first surface 14A of the substrate 14 may not be in contact with each other. Additionally, as illustrated in FIG. 7, the end part of the first protective film 32A may be bent at a corner part 14C that is a boundary of the first surface 14A of the substrate 14 where the pixels 16 are formed, and the first protective film 32A may cover the front surface of the first surface 14A in the vicinity of the corner part 14C.

Meanwhile, as illustrated in FIG. 6, the second protective film 32B covers a region including the region 17 and the entire first protective film 32A. Specifically, the second protective film 32B covers the conversion layer 30 and the pixels 16 that are covered with the first protective film 32A, and covers the same region as the protective film 32 of the first embodiment.

Such a first protective film 32A includes, for example, a parylene film or the like. In this case, the first protective film 32A can be formed by vapor deposition. Additionally, the second protective film 32B includes the insulating sheet or the like. In this case, the second protective film 32B can be provided by being glued with an adhesive or the like.

In this way, in the radiation detector 10 of the present embodiment, so to speak, the second protective film 32B is provided in the same region as the protective film 32 of the first embodiment with respect to the sensor board 12 in which the front surface of the conversion layer 30, the side surface of the conversion layer 30, and the side surface of the pixels 16 are covered with the first protective film 32A.

In the radiation detector 10 of the present embodiment illustrated in FIGS. 6 and 7, the second protective film 32B is provided similarly to the protective film 32 of the first embodiment. Therefore, according to the radiation detector 10 of the present embodiment, the effect of suppressing the peeling of the conversion layer 30 can be further enhanced similarly to the radiation detector 10 of the first embodiment. Therefore, according to the radiation detector 10 of the present embodiment, the peeling of the conversion layer 30 is suppressed and the degradation of moisture resistance is suppressed. Therefore, the deterioration of the image quality of a generated radiographic image can be suppressed.

Additionally, in the radiation detector 10 of the present embodiment, double sealing is performed by covering the front surface and side surface of the conversion layer 30 with the first protective film 32A and the second protective film 32B, the moisture resistance performance with respect to the conversion layer 30 can be further enhanced. Particularly, CsI is vulnerable to moisture, and in a case where moisture enters the interior of the radiation detector 10, there is a concern that the image quality of a radiographic image may deteriorate. For that reason, in a case where CsI is used for the conversion layer 30, it is preferable to further enhance the moisture resistance performance with respect to the conversion layer 30 as in the radiation detector 10 of the present embodiment.

Third Embodiment

In a radiation detector 10 of the present embodiment, a configuration corresponding to the protective film 32 of the first embodiment is different. Therefore, this different configuration will be described.

Figure 8:
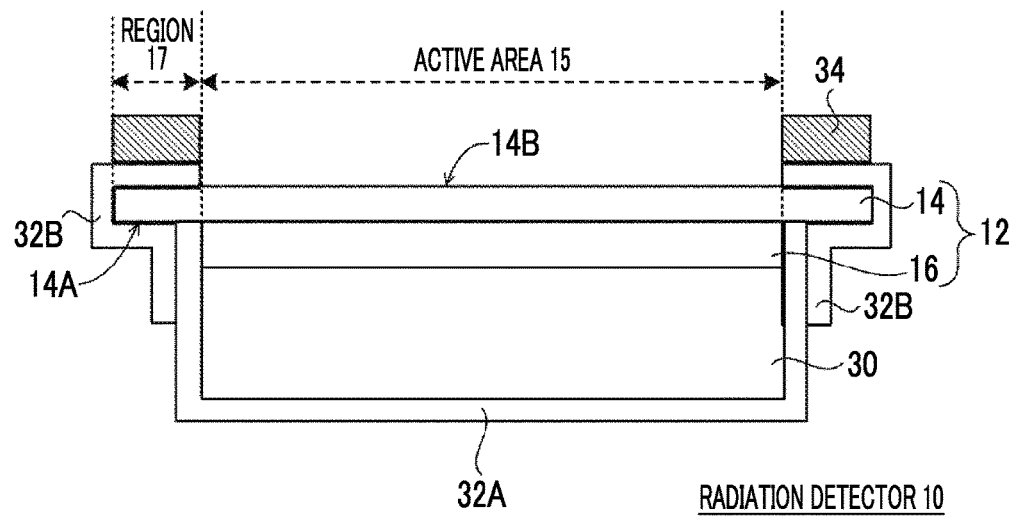
FIG. 8 is a cross-sectional view of an example of a radiation detector of a third embodiment.

A cross-sectional view of an example of the radiation detector 10 of the present embodiment is illustrated in FIG. 8. As illustrated in FIG. 8, the radiation detector 10 of the present embodiment includes two protective films of a first protective film 32A and a second protective film 32B, instead of the protective film 32 of the radiation detector 10 of the first embodiment.

As illustrated in FIG. 8, the first protective film 32A of the present embodiment covers at least the surface of the conversion layer 30 opposite to the side where the sensor board 12 is provided, and the side surface of the conversion layer. Specifically, the first protective film 32A of the present embodiment is provided similarly to the first protective film 32A of the radiation detector 10 of the second embodiment illustrated in FIG. 6, and covers the front surface (the surface that is not in contact with the pixels 16) of the conversion layer 30, the side surface of the conversion layer 30, and the side surface of the pixels 16.

Meanwhile, as illustrated in FIG. 8, the second protective film 32B covers a region including the region 17 and an end part of the first protective film 32A. Specifically, the second protective film 32B covers the region 17 of the second surface 14B of the substrate 14, the side surface of the substrate 14, the region 17 of the first surface 14A of the substrate 14, and the region of the end part of the first protective film 32A. In addition, the region of the end part of the first protective film 32A that is covered with the second protective film 32B is a region within a predetermined range from an outer periphery of the first protective film 32A. In addition, the predetermined range is a range that is experimentally obtained on the basis of the position of the end part of the first protective film 32A in the side surface of the conversion layer 30 or the side surface of the pixels 16, the area of contact between the second protective film 32B and the first protective film 32A required to support the conversion layer 30, and the like.

Such first protective film 32A is, for example, the parylene film or the insulating sheet. In a case where the first protective film is the parylene film, the first protective film 32A can be formed by vapor deposition, and in a case where the first protective film is the insulating sheet, the first protective film 32A can be provided by being glued with an adhesive or the like.

Additionally, the second protective film 32B includes the insulating sheet or the like. In this case, the second protective film 32B can be provided by being glued with an adhesive or the like. In this way, in the radiation detector 10 of the present embodiment, the first protective film 32A and the second protective film 32B are integrated by gluing the first protective film 32A and the second protective film 32B together with an adhesive or the like.

In the radiation detector 10 of the present embodiment illustrated in FIG. 8, the first protective film 32A covers the front surface and the side surface of the conversion layer 30, and the side surface of the pixels 16, and the second protective film 32B covers the first surface 14A and the second surface 14B in the outer peripheral part of the substrate 14 corresponding to the region 17, the side surface of the substrate 14, and the region of the end part of the first protective film 32A. Therefore, the effect of suppressing the peeling of the conversion layer 30 can be further enhanced similarly to the radiation detector 10 of the first embodiment. Therefore, according to the radiation detector 10 of the present embodiment, the peeling of the conversion layer 30 is suppressed and the degradation of moisture resistance is suppressed. Therefore, the deterioration of the image quality of a generated radiographic image can be suppressed.

Fourth Embodiment

In a radiation detector 10 of the present embodiment, a configuration corresponding to the protective film 32 of the first embodiment is different. Therefore, this different configuration will be described.

Figure 9:
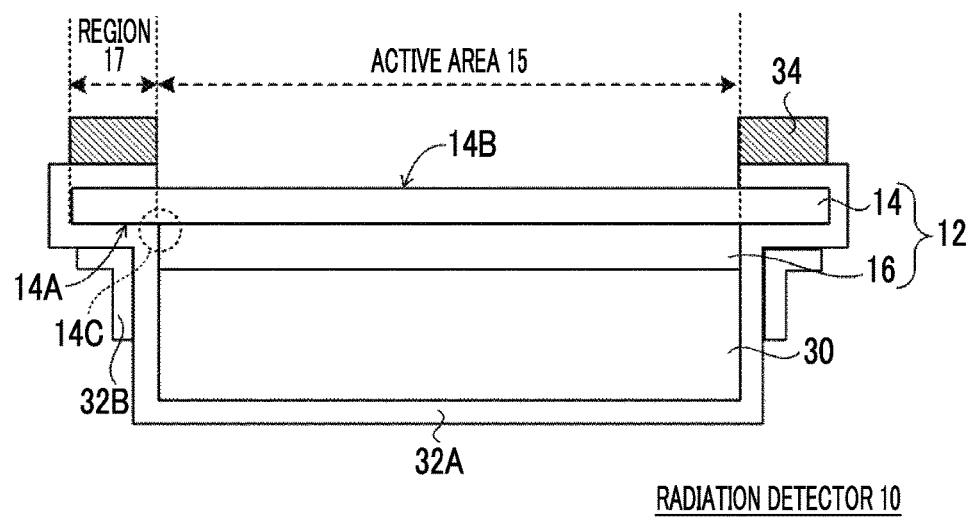
FIG. 9 is a cross-sectional view of an example of a radiation detector of a fourth embodiment.

A cross-sectional view of an example of the radiation detector 10 of the present embodiment is illustrated in FIG. 9. As illustrated in FIG. 9, the radiation detector 10 of the present embodiment includes two protective films of a first protective film 32A and a second protective film 32B, instead of the protective film 32 of the radiation detector 10 of the first embodiment.

As illustrated in FIG. 9, the first protective film 32A in the radiation detector 10 of the present embodiment is the same as the protective film 32 of the first embodiment.

Meanwhile, as illustrated in FIG. 9, the second protective film 32B of the present embodiment covers a region in the vicinity of the corner part 14C that is the boundary between the first surface 14A of the substrate 14 and the pixels 16 via the first protective film 32A. Specifically, the second protective film 32B covers a region ranging from the region corresponding to the region 17 of the substrate 14 to the side surface of the pixels 16 and a portion of the side surface of the conversion layer 30 via the first protective film 32A.

According to the radiation detector 10 of the present embodiment, the first protective film 32A is provided similarly to the protective film 32 of the first embodiment. Therefore, the effect of suppressing the peeling of the conversion layer 30 can be further enhanced similarly to the radiation detector 10 of the first embodiment. Therefore, according to the radiation detector 10 of the present embodiment, the peeling of the conversion layer 30 is suppressed and the degradation of moisture resistance is suppressed. Therefore, the deterioration of the image quality of a generated radiographic image can be suppressed.

Fifth Embodiment

In a radiation detector 10 of the present embodiment, a configuration corresponding to the protective film 32 of the first embodiment is different. Therefore, this different configuration will be described.

Figure 10:
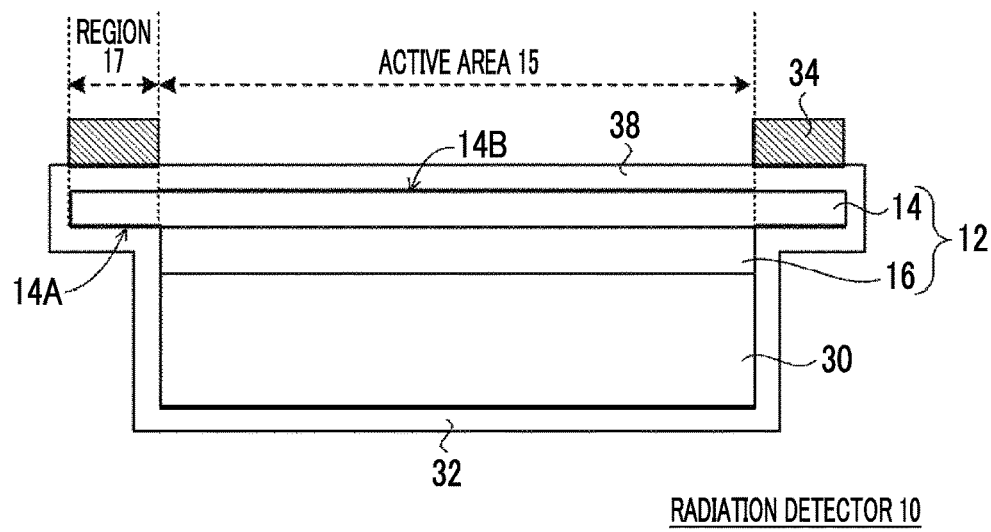
FIG. 10 is a cross-sectional view of an example of a radiation detector of a fifth embodiment.

A cross-sectional view of an example of the radiation detector 10 of the present embodiment is illustrated in FIG. 10. As illustrated in FIG. 10, the radiation detector 10 of the present embodiment is different from the protective film 32 of the radiation detector 10 of the first embodiment in terms of the region covered with the protective film 32.

As illustrated in FIG. 10, the protective film 32 of the present embodiment also covers the entire second surface 14B of the substrate 14 unlike the protective film 32 of the first embodiment. That is, in the radiation detector 10 of the present embodiment, the entire sensor board 12 in a state where the conversion layer 30 is provided is covered with the protective film 32.

According to the radiation detector 10 of the present embodiment, the protective film 32 covers the entire sensor board 12 in a state where the conversion layer 30 is provided. Therefore, the sealability becomes high and the moisture resistance performance with respect to the conversion layer 30 or the sensor board 12 is further improved.

Sixth Embodiment

In a radiation detector 10 of the present embodiment, a configuration corresponding to the protective film 32 of the first embodiment is different. Therefore, this different configuration will be described.

Figure 11:
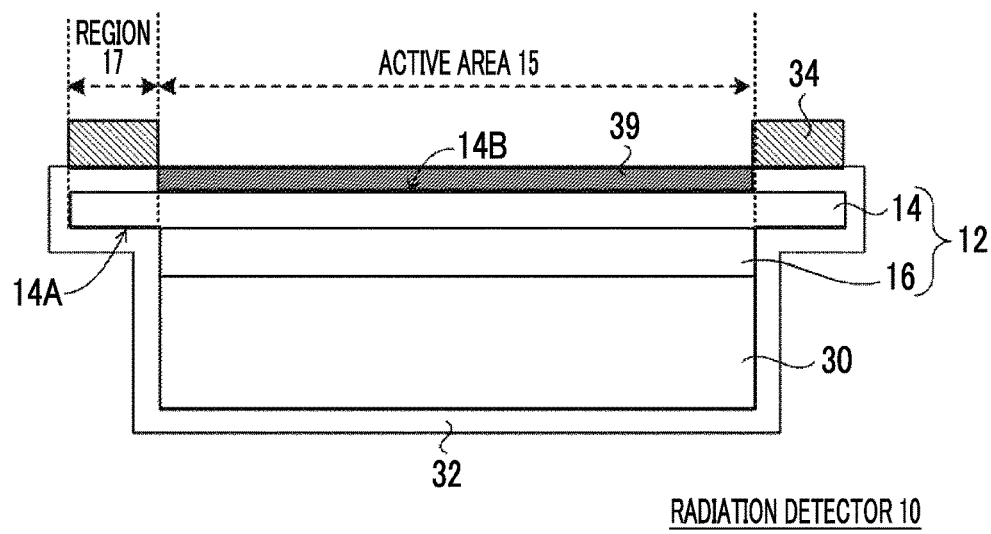
FIG. 11 is a cross-sectional view of an example of a radiation detector of a sixth embodiment.

A cross-sectional view of an example of the radiation detector 10 of the present embodiment is illustrated in FIG. 11. As illustrated in FIG. 11, in the radiation detector 10 of the present embodiment, an antistatic film 39 is provided in the region corresponding to the active area 15 of the second surface 14B of the substrate 14.

As the antistatic film 39, for example, an LAPPET (registered trademark) sheet obtained by laminating aluminum, such as by bonding aluminum foil, on the insulating sheet (film), such as polyethylene terephthalate, a film using an antistatic coating material "COLCOAT" (trade name: made by COLCOAT CO., LTD.), or the like are applicable.

Since the substrate 14 of the present embodiment has flexibility, and the thickness of the substrate 14 is thinner than the radiation detector that does not have general flexibility, the substrate 14 is easily charged due to friction or the like, and is unevenly charged within the surface of the substrate 14. In this way, in a case where the uneven charging or the like occurs, unevenness is caused in a generated radiographic image.

Meanwhile, in the radiation detector 10 of the present embodiment, the antistatic film 39 is provided in the region corresponding to the active area 15 of the second surface 14B of the substrate 14. Therefore, the charging of the substrate 14 can be suppressed. For that reason, according to the radiation detector 10 of the present embodiment, uneven charging within the surface of the substrate 14 can also be suppressed.

As described above, the radiation detector 10 of each of the above embodiments includes the flexible substrate 14, and the sensor board 12 including the layer which is provided on the first surface 14A of the substrate 14 and in which the plurality of pixels 16, which accumulate electrical charges generated in accordance with light converted from radiation, are formed, the conversion layer 30 that is provided on the first surface 14A side of the sensor board 12 to convert radiation into light, the protective film 32 that covers at least the region ranging from the region that covers the conversion layer 30 to the region 17 at the outer peripheral part of the second surface 14B opposite to the first surface 14A of the substrate 14, and the supporting member 34 that supports the region 17 of the substrate 14 via the protective film 32 from the second surface 14B side of the substrate 14.

According to the radiation detector 10 of each of the above embodiments, the protective film 32 and the supporting member 34 are provided. Accordingly, the conversion layer 30 is not easily peeled even in a case where the substrate 14 is deflected. Additionally, in the radiation detector 10 of each of the above embodiments, the supporting member 34 supports the region 17, which is the outer peripheral region of the substrate 14, from the second surface 14B. Therefore, even in a case where the flexible substrate 14 is deflected, the deflection in the region 17 is suppressed by the supporting member 34. Therefore, since the protective film 32 is not peeled from the sensor board 12 and the conversion layer 30, the effect of suppressing the peeling of the conversion layer 30 can be further enhanced.

In this way, in the radiation detectors 10 of the above embodiments, the peeling of the conversion layer 30 is suppressed and the degradation caused by humidity or the like is suppressed. Therefore, the deterioration of the image quality of a generated radiographic image can be suppressed. Therefore, according to the radiation detector 10 of each of the above embodiments, in a case where the flexible substrate 14 is used for the sensor board 12, the deterioration of the image quality of a radiographic image can be suppressed.

Figure 12:
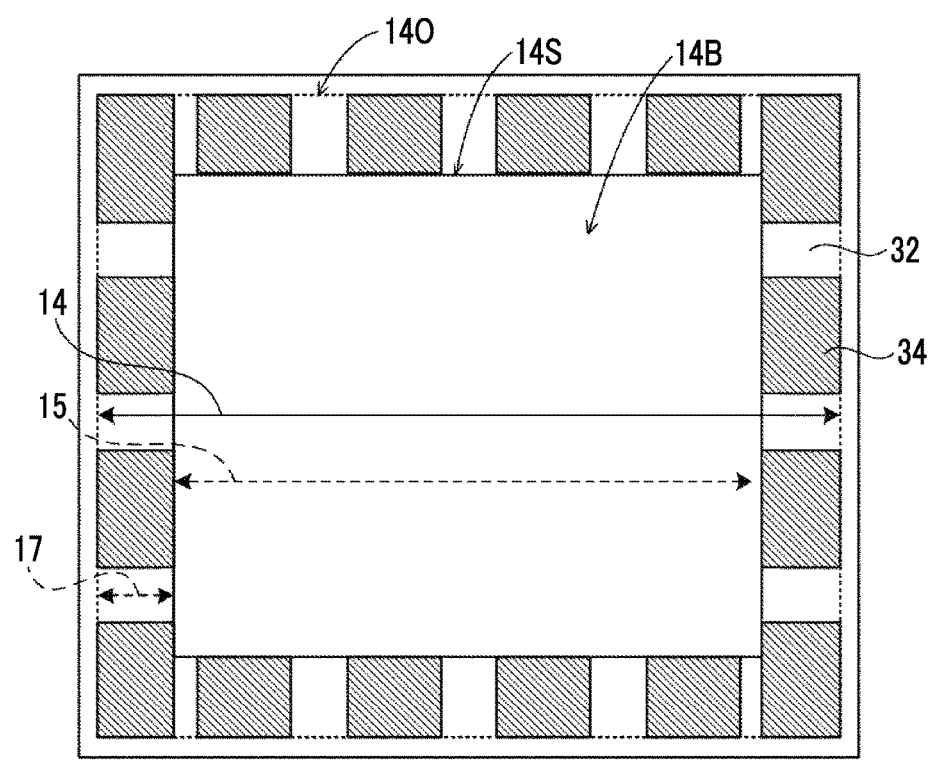
FIG. 12 is a plan view of the radiation detector as seen from the side opposite to the side where the conversion layer is provided in order to describe another example of a supporting member.

In addition, although a form in which the supporting member 34 is provided in the entire region 17 that is the region outside the region on the second surface 14B of the substrate 14 corresponding to the active area 15 has been described in each of the above embodiments, positions where supporting members 34 are provided, the number of supporting members 34, and the like are not limited to each of the above embodiments. As described above, in a case where a form in which the deflection in the region 17 can be suppressed by the supporting member 34 is provided, it goes without saying that that the specific number of supporting members 34 and the size and the arrangement of individual supporting members 34 in a case where a plurality of supporting members 34 are provided are limited. For example, as illustrated in FIG. 12, a plurality of (sixteen in FIG. 12) supporting members 34 may be provided along a peripheral edge 14S on the peripheral edge 14S inward at a predetermined distance from an outer periphery 14O of the second surface 14B of the substrate 14. In addition, in the radiation detector 10 illustrated in FIG. 12, the peripheral edge 14S where the supporting member 34 is provided is the boundary between the active area 15 and the region 17. However, the invention is not limited particularly. In addition, it is preferable that the total length of the plurality of supporting members 34 along the peripheral edge 14S is equal to or more than half of the length of the peripheral edge 14S or less than the length of the peripheral edge 14S from a viewpoint of suppressing the deflection in the region 17 by the supporting member 34.

Figure 13:
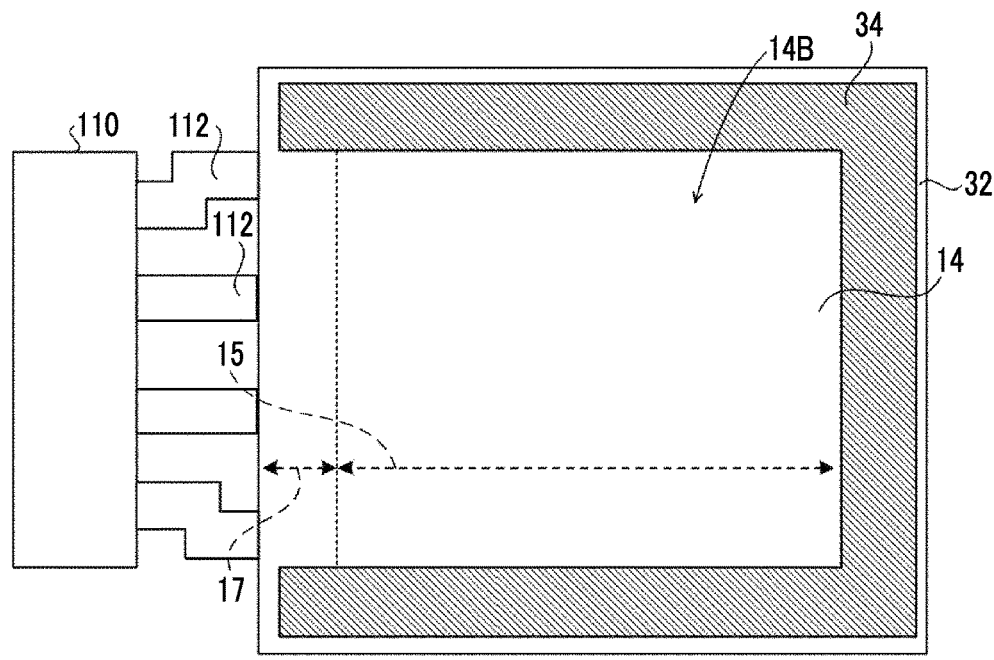
FIG. 13 is a plan view of the radiographic imaging apparatus as seen from the side opposite to the side where the conversion layer of the radiation detector is provided in order to describe another example of a position where the supporting member is provided.

Additionally, for example, a form in which the supporting members 34 are provided at all the sides of the rectangular sensor board 12 has been described in each of the above embodiments. However, the supporting members 34 may be only at some sides of the sensor board 12. For example, as illustrated in FIG. 13, no supporting member 34 may be provided at the side of the sensor board 12 to which the flexible cable 112 connecting the sensor board 12 and the control board 110 together is connected. In addition, in a case where the sensor board 12 has one or more pairs of facing sides as in the radiation detector 10 of each of the above embodiments, the supporting members 34 support the substrate 14 at the facing sides. Accordingly, the conversion layers 30 are not easily peeled. Therefore, in such a case, it is preferable that the supporting members 34 are respectively provided at the sides of the pair of sides. Additionally, it is more preferable to provide the supporting members 34 respectively at three or more sides of the sensor board 12 as in the radiation detector 10 of each of the above embodiments.

Figure 14:
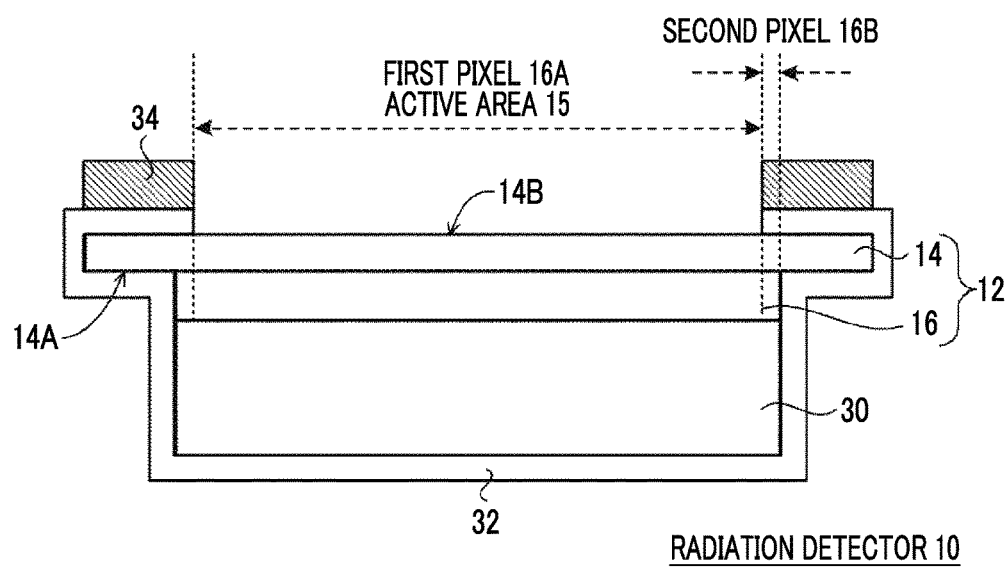
FIG. 14 is a cross-sectional view of another example of the radiation detector for describing another example of an active area.

Additionally, in the radiation detector 10 of each of the above embodiments, a form in which the entire region where the pixels 16 are provided is the active area 15 has been described. However, the region used as the active area 15 is not limited to that in each of the above embodiments. For example, the active area 15 may be specified by a region corresponding to some pixels 16 among the plurality of pixels 16. For example, in the radiation detector 10, as illustrated in FIG. 14, there is a case in which the pixels 16 include a plurality of first pixels 16A substantially corresponding to pixels of a radiographic image, and a plurality of second pixels 16B that have a different application in the formation of the radiographic image and are provided at an outer peripheral part of the first pixels 16A. In addition, the different application in the formation of the radiographic image herein means, for example, a case where the pixels are not used in the formation of the radiographic image but electrical charges thereof are discarded, in addition to a case where the pixels are used for the correction of the image. In the radiation detector 10 illustrated in FIG. 14, the region where the first pixels 16A are provided is defined as the active area 15.

In addition, as in the radiation detector 10 illustrated in FIG. 14, there is a case where the conversion layer 30 is larger than the active area 15 and the conversion layer 30 covers the entire active area 15. For example, in cases where the deviation of a vapor deposition position, the deviation of a gluing position, or the like with respect to the sensor board 12 in the formation of the conversion layer 30 are taken into consideration in addition to the above case illustrated in FIG. 14, the conversion layer 30 is provided to be larger than the active area 15. In this case, as illustrated in FIG. 14, it is preferable to sandwich and support the substrate 14 by the supporting member 34 and the conversion layer 30 outside the active area 15.

Additionally, a case where the radiation detector 10 (radiographic imaging apparatus 1) is applied to the ISS type has been described in each of the above embodiments. However, the radiation detector 10 (radiographic imaging apparatus 1) may be applied to a so-called "penetration side sampling (PSS) type" in which the sensor board 12 is disposed on a side opposite to a side that the radiation of the conversion layer 30 enters. Even in a case where the PSS type is applied, the substrate 14 is deflected. Accordingly, the substrate 14 is pulled in the out-plane direction opposite to the side where the conversion layer 30 is provided. Even in this case, according to the radiation detector 10 of each of the above embodiments, the protective film 32 and the supporting member 34 are provided. Accordingly, the peeling of the conversion layer 30 can be suppressed even in a case where the substrate 14 is deflected.

Figure 15:
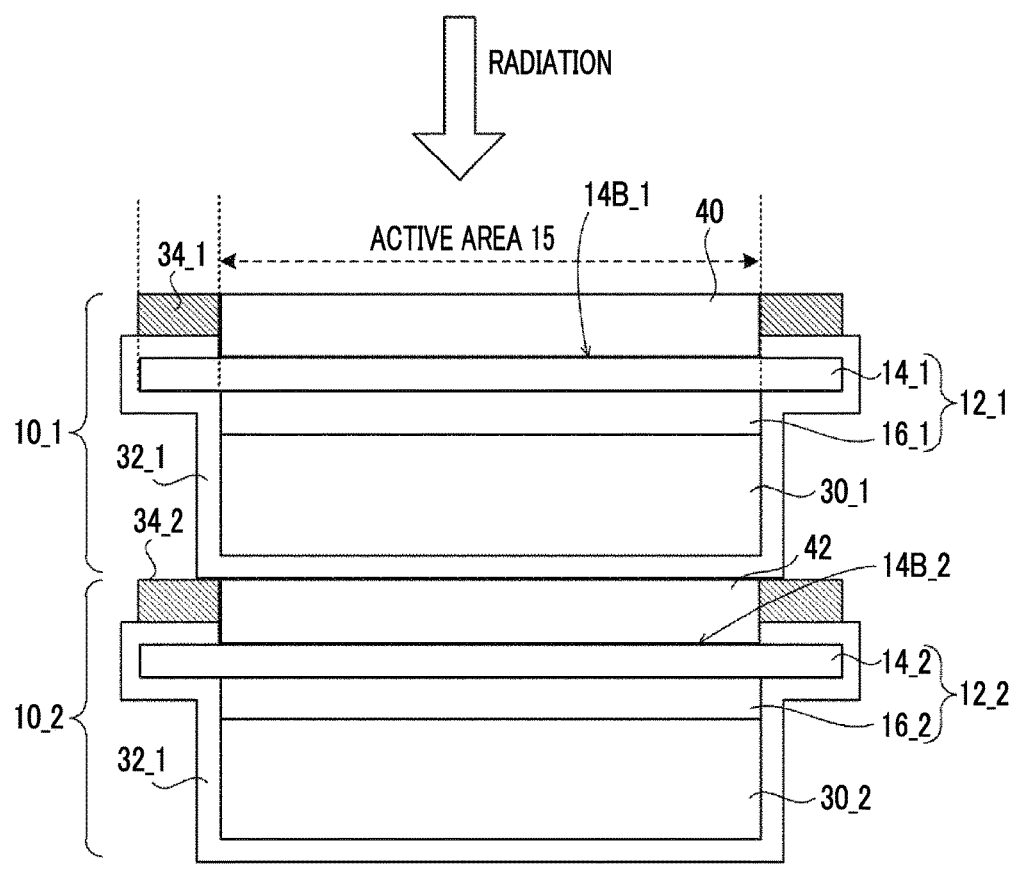
FIG. 15 is a cross-sectional view of an example of a plurality of radiation detectors in the radiographic imaging apparatus including the plurality of (two) radiation detectors.

Additionally, a form in which the radiographic imaging apparatus 1 includes one radiation detector 10 has been described in each of the above embodiments. However, a form in which the radiographic imaging apparatus 1 includes a plurality of radiation detectors 10 may be adopted. For example, as illustrated in FIG. 15, the radiographic imaging apparatus 1 may have a form in which ISS-type radiation detectors 10_1 and 10_2 are used in an overlapping manner in the direction in which radiation is irradiated. In the case illustrated in FIG. 15, a radiation detector 10_1 in which a conversion layer 30_1 using CsI is formed by being directly vapor-deposited on a sensor board 12_1 in which pixels 16_1 are provided in a flexible substrate 14_1 is disposed at a position near an irradiation side of radiation. Additionally, a radiation detector 10_2 in which a conversion layer 30_2 is formed by gluing a GOS sheet to a sensor board 12_2 in which pixels 16_2 are provided in a flexible substrate 14_2 is disposed at a position distant from the irradiation side of radiation. In addition, as in the radiation detector 10 of the first embodiment, a state where a protective film 32_1 and a supporting member 34_1 are provided in the radiation detector 10_1 and a protective film 32_2 and a supporting member 34_2 are provided in the radiation detector 10_2 are illustrated in FIG. 15.

In this case, it is preferable that a buffer layer 40 having transparency with respect to radiation is provided on a second surface 14B_1 of the substrate 14_1. Additionally, a tip of a columnar crystal of CsI of the conversion layer 30_1 faces the radiation detector 10_2 side. Therefore, in order to prevent the tip of the columnar crystal or its peripheral part from being damaged, it is preferable to provide a buffer layer 42 having transparency with respect to visible light on a second surface 14B_2 of the substrate 14_2, that is, between the substrate 14_2 and the protective film 32_1.

Additionally, in each of the above embodiments, as illustrated in FIG. 1, an aspect in which the pixels 16 are two-dimensionally arrayed in a matrix has been described. However, the pixels 16 may be one-dimensionally arrayed or may be arrayed in a honeycomb shape. Additionally, the shape of the pixels is also not limited, and may be a rectangular shape, or may be a polygonal shape, such as a hexagonal shape. Moreover, it goes without saying that the shape of the active area 15 is also not limited.

In addition, it goes without saying that the configurations, manufacturing methods, and the like of the radiographic imaging apparatuses 1, the radiation detectors 10, and the like that are described in the respective above embodiments are merely examples, and can be modified in accordance with situations without departing from the scope of the invention.

What is claimed is:

1. A radiation detector comprising:
   a sensor board including a flexible substrate and a layer which is provided on a first surface of the substrate and in which a plurality of pixels, which accumulate electrical charges generated in accordance with light converted from radiation, are formed;
   a conversion layer that is provided on the first surface side of the sensor board to convert radiation into light;
   a protective film that covers at least a region ranging from a region that covers the conversion layer to a predetermined region at an outer peripheral part of the second surface opposite to the first surface of the substrate; and
   a supporting member that supports the predetermined region of the substrate via the protective film from the second surface side of the substrate.

2. The radiation detector according to claim 1,
   wherein the predetermined region is a region on the second surface of the substrate corresponding to the outside of a region on the first surface of the substrate corresponding to a pixel region that is a region where the plurality of pixels are provided.

3. The radiation detector according to claim 1,
   wherein the plurality of pixels include a plurality of first pixels, and a plurality of second pixels that are provided at an outer peripheral part of the plurality of first pixels and have a different application from the plurality of first pixels in forming a radiographic image, and
   wherein the predetermined region is a region on the second surface of the substrate corresponding to the outside of a region where the plurality of first pixels are provided.

4. The radiation detector according to claim 1,
   wherein a plurality of the supporting members are provided along a peripheral edge on the peripheral edge inward at a predetermined distance from an outer periphery of the second surface, and
   wherein a total length of the plurality of supporting members along the peripheral edge is equal to or more than half of a length of the peripheral edge and less than the length of the peripheral edge.

5. The radiation detector according to claim 1,
   wherein the sensor board has a pair of facing sides, and
   wherein the supporting member is provided at least at each of the pair of sides.

6. The radiation detector according to claim 1,
   wherein the protective film includes at least a first protective film that covers a surface opposite to a surface of the conversion layer where the sensor board is provided and a side surface of the conversion layer, and a second protective film that covers a region including the predetermined region and the entire first protective film.

7. The radiation detector according to claim 1,
   wherein the protective film includes at least a first protective film that covers a surface opposite to a surface of the conversion layer where the sensor board is provided and a side surface of the conversion layer, and a second protective film that covers a region including the predetermined region and an end part of the first protective film.

8. The radiation detector according to claim 1, further comprising:
   an antistatic film provided on the second surface of the substrate.

9. The radiation detector according to claim 1,
   wherein the protective film covers the entire second surface.

10. The radiation detector according to claim 1, being used for imaging in which the second surface of the substrate is irradiated with radiation.

11. The radiation detector according to claim 1,
    wherein the conversion layer includes CsI.

12. A radiographic imaging apparatus comprising:
    the radiation detector according to claim 1;
    a control unit that outputs control signals for reading electrical charges accumulated in the plurality of pixels;
    a drive unit that reads the electrical charges from the plurality of pixels in accordance with the control signals; and
    a signal processing unit to which electrical signals according to the electrical charges read from the plurality of pixels are input, and which generates image data according to the input electrical signals to output the image data to the control unit.

13. The radiographic imaging apparatus according to claim 12,
    wherein the control unit and the radiation detector are provided side by side in a direction intersecting a lamination direction in which a substrate in the radiation detector, a layer in which the plurality of pixels are formed, and a conversion layer are arranged.

14. The radiographic imaging apparatus according to claim 12, further comprising:
    a power source unit that supplies electrical power to at least one of the control unit, the drive unit, or the signal processing unit,
    wherein the power source unit, the control unit, and the radiation detector are provided side by side in a direction intersecting a lamination direction in which a substrate in the radiation detector, a layer in which the plurality of pixels are formed, and a conversion layer are arranged.

* * * * *